(12) United States Patent
Murata et al.

(10) Patent No.: US 9,132,759 B2
(45) Date of Patent: Sep. 15, 2015

(54) VEHICLE SEAT

(71) Applicants: TOYOTA BOSHOKU KABUSHIKI KAISHA, Aichi-ken (JP); MOLD TECHNICAL OFFICE CO., LTD., Kanagawa-ken (JP)

(72) Inventors: Yoshiyuki Murata, Aichi-ken (JP); Tetsuo Hayashida, Aichi-ken (JP); Toshio Iwasawa, Kanagawa-ken (JP)

(73) Assignees: TOYOTA BOSHOKU KABUSHIKI KAISHA, Aichi-Ken (JP); MOLD TECHNICAL OFFICE CO., LTD., Kanagawa-Ken (JP)

( * ) Notice: Subject to any disclaimer, the term of this patent is extended or adjusted under 35 U.S.C. 154(b) by 0 days.

(21) Appl. No.: 13/868,250

(22) Filed: Apr. 23, 2013

(65) Prior Publication Data

US 2013/0300178 A1 Nov. 14, 2013

(30) Foreign Application Priority Data

May 9, 2012 (JP) ................. 2012-107546

(51) Int. Cl.
*B60N 2/64* (2006.01)
*B60N 2/68* (2006.01)
*B60N 2/44* (2006.01)

(52) U.S. Cl.
CPC ............... *B60N 2/646* (2013.01); *B60N 2/449* (2013.01); *B60N 2/68* (2013.01)

(58) Field of Classification Search
CPC .......... B60N 2/449; B60N 2/646; B60N 2/68
USPC .............. 297/284.9, 452.26, 152.34, 452.35, 297/452.36
See application file for complete search history.

(56) References Cited

U.S. PATENT DOCUMENTS

| 1,463,334 | A | * | 7/1923 | Popkin | 297/452.34 |
| 3,713,696 | A | * | 1/1973 | Dudley | 297/452.55 |
| 3,833,454 | A | * | 9/1974 | Ambrose | 297/452.57 |
| 4,368,917 | A | * | 1/1983 | Urai | 297/452.54 |

(Continued)

FOREIGN PATENT DOCUMENTS

| CN | 102009607 | 4/2011 |
| DE | 3916698 | 11/1990 |

(Continued)

OTHER PUBLICATIONS

German Office action, dated Jan. 10, 2014 along with an English-language translation thereof.
China Office action, dated Feb. 17, 2015 along with an English translation thereof.

*Primary Examiner* — Peter Brown
(74) *Attorney, Agent, or Firm* — Greenblum & Bernstein, P.L.C.

(57) ABSTRACT

Embodiments of the present invention may include a vehicle seat having a cushion pad, a surface member, and a rigid member. The cushion pad may be equipped with a main portion for supporting an occupant, and a side support portion provided on a side of the main portion. The side support portion may protrude from the main portion so as to support the occupant. The surface member is provided on a surface of the cushion pad. The rigid member is provided inside the side support portion of the cushion pad. The rigid member is of higher rigidity than the cushion pad, and protrudes in the same direction in which the side support portion protrudes. The rigid member has an end portion contacting the surface member.

10 Claims, 5 Drawing Sheets

(56) References Cited

U.S. PATENT DOCUMENTS

| | | | | |
|---|---|---|---|---|
| 4,804,221 A | * | 2/1989 | Saiki | 297/284.9 |
| 5,022,709 A | * | 6/1991 | Marchino | 297/452.24 |
| 5,067,772 A | * | 11/1991 | Koa | 297/452.55 |
| 5,280,997 A | * | 1/1994 | Andres et al. | 297/284.9 |
| 6,027,171 A | * | 2/2000 | Partington et al. | 297/452.18 |
| 6,033,024 A | * | 3/2000 | Pfau et al. | 297/452.26 |
| 6,257,664 B1 | * | 7/2001 | Chew et al. | 297/284.9 |

FOREIGN PATENT DOCUMENTS

| | | | |
|---|---|---|---|
| DE | 102005051422 | | 5/2007 |
| EP | 1167116 | * | 1/2002 |
| FR | 2003863 | | 11/1969 |
| JP | 2001-327357 | | 11/2001 |

\* cited by examiner

VEHICLE SEAT

This application claims priority to Japanese patent application serial number 2012-107546, the contents of which are incorporated herein by reference.

BACKGROUND OF THE INVENTION

1. Field of the Invention

Embodiments of the present invention relate to vehicle seats.

2. Description of the Related Art

A vehicle seat generally has a cushion pad placed on a seat frame. The cushion pad is equipped with a main portion forming the seating surface for an occupant seated thereon, and side support portions provided on the sides of the main portion. The side support portions protrude from the main portion so as to support the sides of the body of the occupant.

The side support portions of the vehicle seat are of higher rigidity than the main portion, and are not subject to deformation with respect to external forces. Thus, the side support portions can effectively support the occupant, and suppress the discomfort due to side wires provided in the seat frame. However, when the side support portions exhibit generally high rigidity, the occupant cannot but experience their hardness when he touches them. Thus, it is desirable for the side support portions to have surfaces endowed with the same softness as that of the main portion. It is also desired that they have rigid cores.

According to Japanese Laid-Open Patent Application No. 2001-327357, previously formed insert material made of foam is inserted into a foaming mold. The insert material is set in position in the foaming mold. A foam stock solution is poured into the mold to cause foaming. As a result, a layer having relatively high rigidity is formed on a surface of the insert material. As a result, the surfaces of the side support portions are endowed with the same softness as that of the main portion. The cores exhibit rigidity at predetermined positions. The reason for forming a layer of relatively high rigidity on the surface of the insert material is to impregnate the surface portion of the insert material with the foam stock solution when pouring the foam stock solution into the mold, thus making the rigidity of that portion relatively high.

To insert the insert material into the foaming mold and to support it, it is necessary to provide a support member. As the support member is not a part of the final product, it is removed from the insert material after the completion of the molding. As a result of the removal of the support member, there remains a deficient portion at the corresponding area of the product. The deficient portion appears on the surface of the cushion pad, resulting in deterioration in the quality of the vehicle seat.

Therefore, there is need in the art for a vehicle seat involving no appearance of a deficient portion on the surface of the cushion pad resulting from the removal of the support member as mentioned above.

SUMMARY OF THE INVENTION

According to one aspect of the present invention, embodiments of the present invention may include a vehicle seat having a cushion pad, a surface member, and a rigid member. The cushion pad may be equipped with a main portion for supporting an occupant, and a side support portion provided on a side of the main portion. The side support portion may protrude from the main portion so as to support a side of the occupant. The surface member is provided on a surface of the cushion pad. The rigid member is provided inside the side support portion of the cushion pad. The rigid member is of a higher rigidity than the cushion pad, and protrudes in the same direction in which the side support portion protrudes. The rigid member has an end portion contacting the surface member.

Thus, the surface of the side support portion has substantially the same softness as that of the main portion (the seating surface portion). Preferably, only the core of the side support portion has high rigidity. The rigid member preferably contacts the surface member and in some embodiments may be integrated with the surface member. Thus the surface member may support the rigid member. Thereby, there is no need to provide, on the surface side of the side support portion, a support member for supporting the rigid member during formation of the cushion pad. As a result, no deficient portion resulting from the support member appears on the surface of the side support portion after formation of the support member. Further, the surface member inherently appears on the surface of the cushion pad after the formation of the cushion pad. The appearance of the surface member contacting the rigid member on the surface of the cushion pad preferably does not adversely affect the cushion pad.

According to another aspect of the present invention, the rigid member may comprise cloth, and may be firmly and integrally attached to the surface member. The cloth may have woven threads. Thus, through appropriate selection of the threads, it is possible to freely set the rigidity, thickness, etc. of the rigid members. As a result, it is possible to easily give appropriate rigidity to the side support portion at any certain area.

According to another aspect of the present invention, the surface member may have a portion corresponding to the main portion of the cushion pad. The portion may be formed integrally with the rigid member. Thus, by fixing the surface member of the main portion inside the foaming mold, the rigid member is also fixed in position inside the mold. By foam-molding the cushion pad within the mold, the rigid member is firmly attached to the back surface of the cushion pad. Accordingly, there is no need to provide a support for the rigid member inside the foaming mold prior to foam-molding of the cushion pad. As a result, it is possible to achieve an improvement in terms of the productivity of the cushion pad.

DETAILED DESCRIPTION OF THE INVENTION

Each of the additional features and teachings disclosed above and below may be utilized separately or in conjunction with other features and teachings to provide improved vehicle seats. Representative examples of the present invention, which utilize many of these additional features and teachings both separately and in conjunction with one another, will now be described in detail with reference to the attached drawings. This detailed description is merely intended to teach a person of ordinary skill in the art further details for practicing preferred aspects of the present teachings and is not intended to limit the scope of the invention. Only the claims define the scope of the claimed invention. Therefore, combinations of features and steps disclosed in the following detailed description may not be necessary to practice the invention in the broadest sense, and are instead taught merely to particularly describe representative examples of the invention. Moreover, various features of the representative examples and the dependent claims may be combined in ways that are not specifically enumerated in order to provide additional useful configurations of the present teachings.

Figure 1:
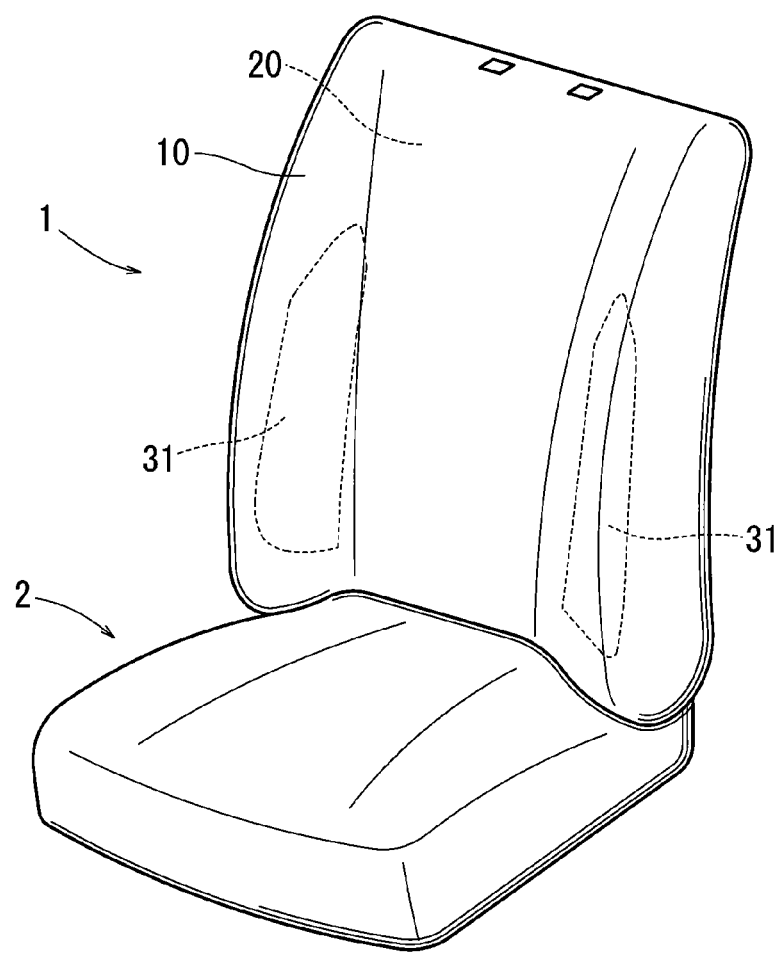
FIG. 1 is a perspective view of an embodiment of a vehicle seat of the present invention.
Figure 2:
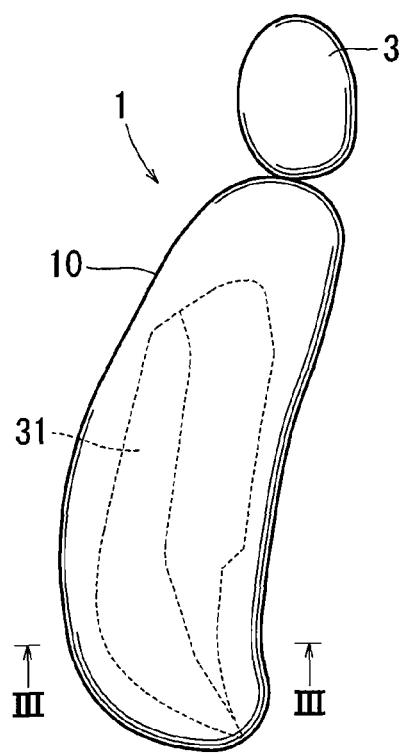
FIG. 2 is a side view of a seatback of an embodiment of a seat.
Figure 3:
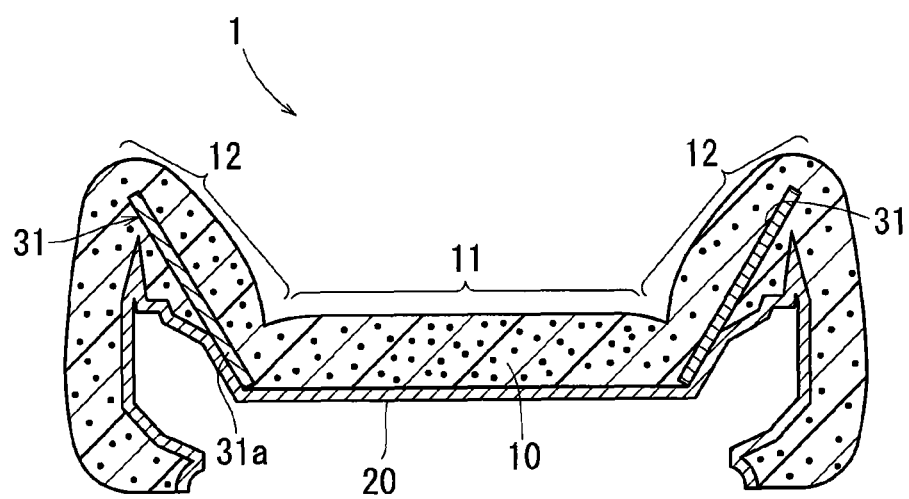
FIG. 3 is a cross-sectional view taken along line in FIG. 2.

As shown in FIGS. 1 to 3, a vehicle seat has a seat back 1 and a seat cushion 2. The seat back 1 and the seat cushion 2 have a seat frame (not shown) and a cushion pad 10 placed on the seat frame. Referring to FIG. 3, the cushion pad 10 of the seat back 1 is equipped with a main portion 11 forming a seating surface for an occupant seated on the sear, and side support portions 12 provided on sides of the main portion 11. The side support portions 12 protrude from the main portion 11 so as to support the sides of the occupant.

The cushion pad 10 has a back surface facing the seat frame. A back surface member 20 is provided on the back surface of the cushion pad 10. The back surface member 20 protects the back surface from damage resulting from rubbing between the back surface and the seat frame. It is possible to use cloth (cotton, hemp, silk, or a mixture of these) or heat-pressed non-woven cloth in constructing the back surface member 20.

Rigid members 31 may be provided inside the side support portions 12 of the cushion pad 10. The rigid members 31 exhibit higher rigidity than the cushion pad 10, and extend in the direction in which the side support portions 12 protrude. The rigid members 31 may be formed of cloth typically used in carpeting. The rigid members 31 preferably have end portions 31a in close proximity to the back surface of the cushion pad 10, and the end portions 31a may be firmly fixed to the back surface member 20 through heat pressing.

The back surface member 20 and the rigid members 31 may be bonded by an adhesive or sewn with sewing thread. Like the back surface member 20, the rigid members 31 may consist of heat-pressed, non-woven cloth. The weight of the non-woven cloth of the back surface member 20 preferably ranges from 100 to 140 g/lm$^2$, and the weight of the rigid members 31 preferably ranges from 300 to 400 g/lm$^2$. In FIG. 2, a headrest 3 of the vehicle seat is shown.

When producing the seat back 1, the rigid members 31 may be firmly fixed to and/or integrated with the back surface member 20 through heat pressing. The back surface member 20 and the rigid members 31 are fixed in position within the foaming mold and then foam stock solution is poured into the mold. The foam stock solution is heated to undergo foaming. As a result, as shown in FIG. 3, the rigid members 31 integrated with the back surface member 20 are arranged inside the foam cushion pad 10.

As shown in FIG. 3, the cushion pad 10 is foam-molded in a vertically reverse fashion inside the mold. That is, the surface of the cushion pad 10 is formed by a lower mold, and the back surface of the cushion pad 10 is formed by an upper mold. In order that they may not fall due to the gravitational force at the time of molding, the back surface member 20 and the rigid members 31 are held in contact with the upper mold and are kept fixed to the upper mold by a fixation member.

As described above, the surfaces of the side support portions 12 are endowed with the same softness as that of the main portion 11. The cores of the side support portions 12 exhibit high rigidity. At the time of molding of the side support portions 12, the rigid members 31 are integrated with and supported by the back surface member 20. Thus, at the time of molding of the cushion pad 10, the rigid members 31 do not move inside the support portions 12 and can be arranged at appropriate positions.

In some embodiments it is not necessary to provide support members for supporting the rigid members 31 from the surface of the side support portions 12. Thus, after molding, deficient portions resulting from support members do not appear on the surfaces of the side support portions 12. The back surface member 20 inherently appears on the back surface of the cushion pad 10 after the molding. Thus, the back surface member 20 does not adversely affect the cushion pad 10.

The rigid members 31 are formed of cloth, which is formed through the weaving of threads. Accordingly, it is possible to relatively freely select the rigidity and configuration of the rigid members 31 due to various types of threads. As a result, it is possible to create a side support portion having various degrees of rigidity located therein.

According to Japanese Laid-Open Patent Application No. 2001-327357, the surface of the insert material is impregnated with the foam stock solution, thereby forming a highly rigid layer on the surface of the insert material. When the foam stock solution is poured into the foaming mold, the insert material is impregnated with the foam stock solution without limit. Thus, in some cases, the layer of high rigidity cannot be formed in a stable manner. In contrast, according to the described above embodiment, the rigidity of the rigid members 31 basically undergoes no change during the foam molding. Rather, it remains relatively constant. Thus, the side support portions 12 can be provided with a desired degree of rigidity.

While the embodiments of invention have been described with reference to specific configurations, it will be apparent to those skilled in the art that many alternatives, modifications and variations may be made without departing from the scope of the present invention. Accordingly, embodiments of the present invention are intended to embrace all such alternatives, modifications and variations that may fall within the spirit and scope of the appended claims. For example, embodiments of the present invention should not be limited to the representative configurations, but may be modified, for example, as described below.

Figure 4:
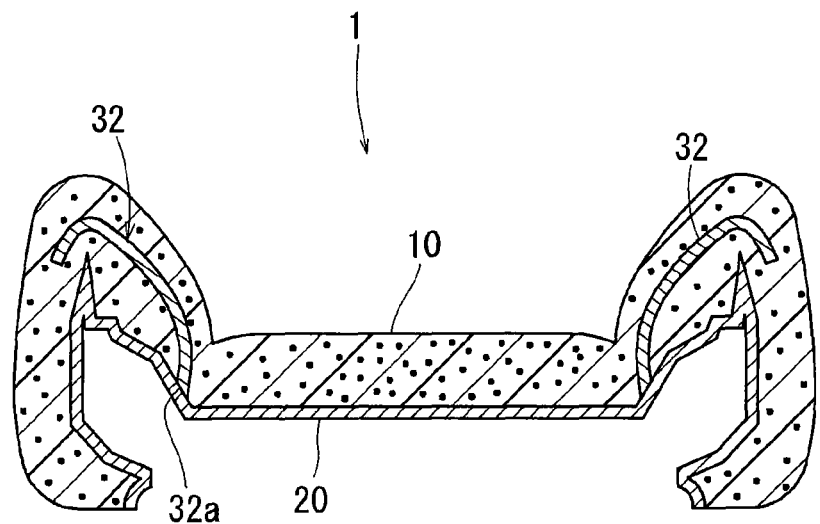
FIG. 4 is a cross-sectional view of the seat back of another configuration, corresponding to FIG. 3.

Instead of the rigid members 31 shown in FIG. 3, the seat back 1 may have rigid members 32 shown in FIG. 4. The rigid members 31 shown in FIG. 3 extend linearly. On the other hand, the rigid members 32 shown in FIG. 4 are curved in conformity with the surface shape of the side support portions 12. Thus, the side support portions 12 may flexibly support the occupant by the rigid members 32 shown in FIG. 4, as compared with the side support portions 12 with the rigid members 31 shown in FIG. 3. The rigid members 32 preferably have end portions 32a directly contacting the surface member 20.

Figure 5:
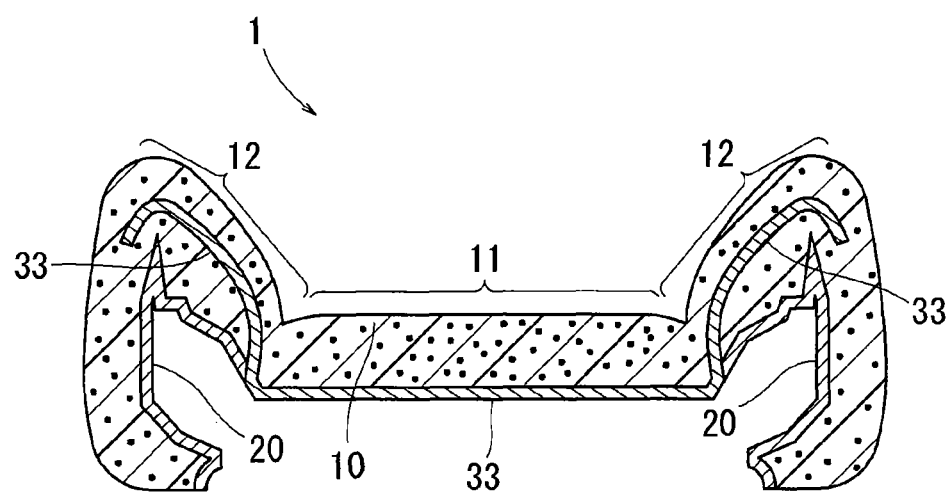
FIG. 5 is a cross-sectional view of the seat back of another configuration, corresponding to FIG. 3.

Instead of the rigid members 31 shown in FIG. 3, the seat back 1 may have a rigid member 33 as shown in FIG. 5. The rigid members 31 shown in FIG. 3 are members separate from the back surface member 20. On the other hand, the rigid member 33 shown in FIG. 5 is formed integrally with the back surface member. The back surface member 20 of FIG. 5 has a main portion corresponding to the main portion 11 of the cushion pad 10, and side portions corresponding to right and left side support portions 12. The main portion of the back surface member 20 is formed integrally with the rigid member 33, thus forming the main portion and the rigid member 33 as one member. The side portions of the back surface member 20 are integrated with the main portion through bonding, via the cushion pad 10, etc.

As in the case of the back surface member 20 shown in FIGS. 3 and 4, the back surface member 20 in this case may consist of cloth or heat-pressed non-woven cloth. Alternatively, it is also possible to apply non-woven cloth mixed with binder to the mold, and to form the back surface member 20 at the time of foam molding of the cushion pad 10. In the case of the rigid member 33 shown in FIG. 5, the rigid member 33 does not need to be bound with the back surface member 20.

In producing the seat back 1 shown in FIG. 5, the rigid member 33 including the main portion of the back surface member 20 is fixed in position within the foaming mold. Inside the foaming mold, the stock solution is caused to foam. The cushion pad 10 is formed through foaming, and the rigid member 33 is firmly attached to the back surface of the cushion pad 10. Thus, as in the case of the cushion pads 10 shown in FIGS. 3 and 4, there is no need to perform the operation of supporting the rigid member 33 within the foaming mold prior the foam molding. As a result, it is possible to achieve an improvement in terms of the manufacturability of the cushion pad 10.

The constructions and methods described above are applicable to the seat back 1, the seat cushion 1, the seat cushion 2, and the headrest 3.

The cushion pad of the vehicle seat may have a plurality of side support portions. Each of the side support portions may be provided with one or more of the rigid members. Alternately, the cushion pad may have one side support portion, for example, at a right or left side area of the cushion pad. The one side support portion may be provided with one or more of the rigid members.

Figure 6:
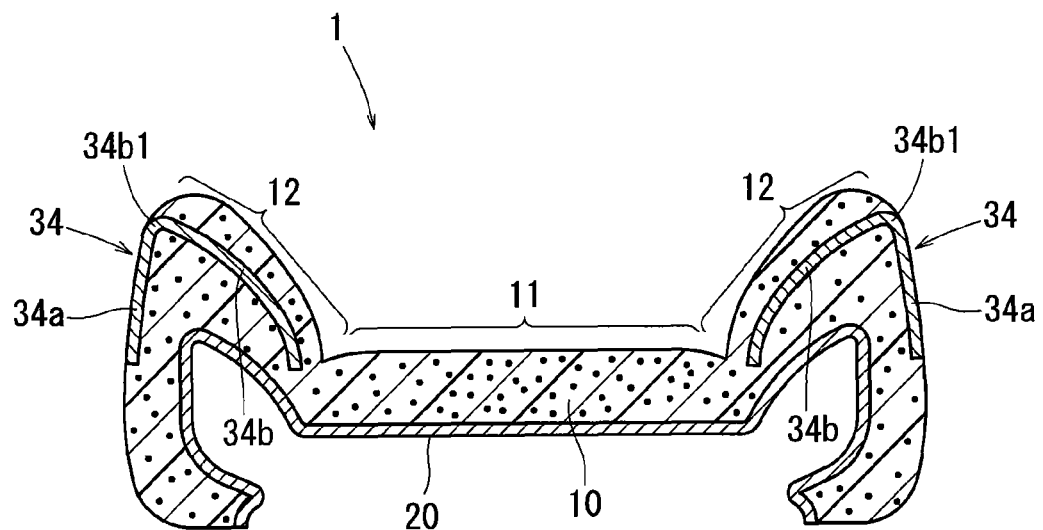
FIG. 6 is a cross-sectional view of the seat back of another configuration, corresponding to FIG. 3.

Instead of the rigid members 31 shown in FIG. 3, the vehicle seat may comprise cushion components 34 shown in FIG. 6. As shown in FIG. 6, each of the cushion components 34 integrally comprises a surface member 34a and a rigid member 34b. The surface member 34a is located on a front or upper surface of the cushion pad 10 at the side support portion 12. The rigid member 34b extends within the cushion pad 10 at the side support portion 12 along with a surface shape of the side support portion 12. The rigid member 34b has an end portion 34b1 contacting directly the surface member 34a.

Figure 7:
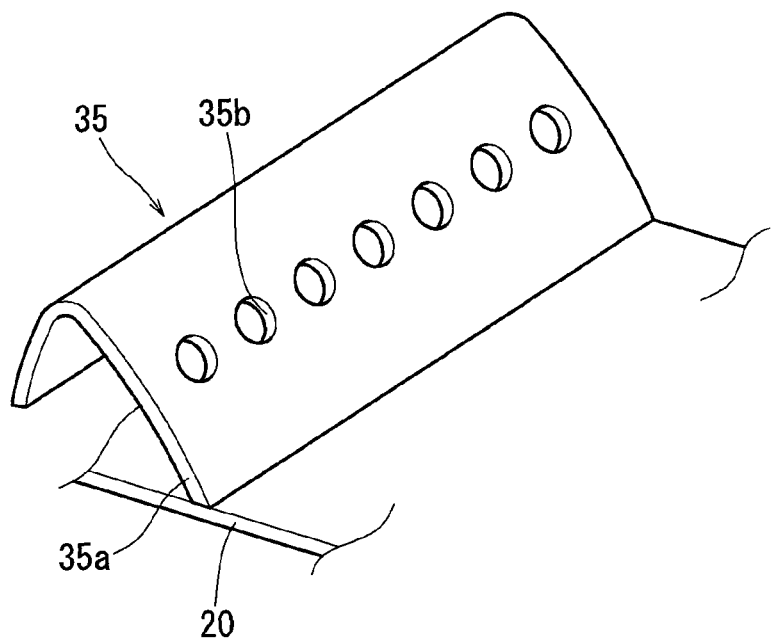
FIG. 7 is a perspective view of a part of a rigid member and a surface member of another configuration.

Instead of having the rigid member 31 shown in FIG. 3, the vehicle seat may have a rigid member 35 shown in FIG. 7. As shown in FIG. 7, the rigid member 35 extends from the surface member 20. The rigid member 35 is provided with an end portion 35a and holes 35b. The end portion 35a directly contacts the surface member 20. The holes 35b are arranged along a longitudinal direction of the rigid member 35. Each of the holes 35b passes through the rigid member 20 so that each of the holes 35b is filled with the cushion pad. In this way, the rigid member 35 can be mounted firmly within the cushion pad.

Figure 8:
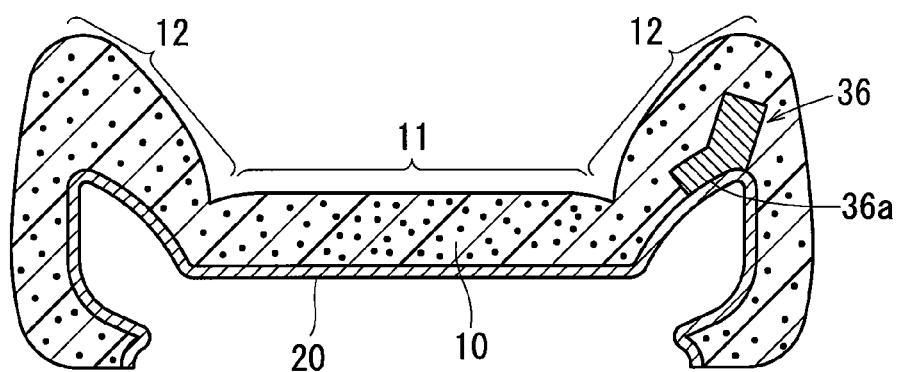
FIG. 8 is a cross-sectional view of the seat back of another configuration, corresponding to FIG. 3.

Instead of having the rigid members 31 shown in FIG. 3, the vehicle seat may have a rigid member 36 shown in FIG. 8. As shown in FIG. 8, the rigid member 36 has a thickness occupying about half of the thickness of the cushion pad 10 at the side support portion 12. The rigid member 36 extends from the surface member 20 along with a surface shape of the side support portion 12. The rigid member 36 has an end portion 36a contacting directly the surface member 20.

As described above the cushion pad may be placed on a cushion support member such as the seat frame of the vehicle seat. In alternative embodiments, a seat frame may not be used. Instead, the cushion support member may be a vehicle body such as a floor of the vehicle on which the cushion pad is placed.

This invention claims:

1. A vehicle seat comprising:
   a cushion pad having
      a main portion for supporting an occupant, and
      a side support portion provided on a side of the main portion, the side support portion protruding from the main portion so as to support a side of the occupant;
   a surface member provided on a back surface of the cushion pad;
   a rigid member provided inside the side support portion of the cushion pad, the rigid member being of higher rigidity than the cushion pad, the rigid member protruding in a direction in which the side support portion protrudes,
   the surface member and the rigid member being separate members wherein the rigid member is laterally supported from a side thereof by the surface member, and
   the rigid member having an end and a side directly connected to a bottom and side, respectively, of the surface member.

2. The vehicle seat of claim 1, wherein the surface member is located on a lower surface of the cushion pad.

3. The vehicle seat of claim 1, further comprising a cushion support member on which the surface member of the cushion pad is placed.

4. The vehicle seat of claim 3, wherein the cushion support member is a seat frame, and wherein the surface member faces the seat frame so as to protect a surface of the cushion pad from damage that can result from being rubbed against the seat frame.

5. The vehicle seat of claim 1, wherein the rigid member comprises cloth, and is firmly attached to the surface member.

6. A vehicle seat comprising:
   a cushion pad having
      a main portion for supporting an occupant, and
      a side support portion provided on a side of the main portion, the side support portion protruding from the main portion so as to support a side of the occupant;
   a surface member provided on a back surface of the cushion pad;
   a rigid member provided inside the side support portion of the cushion pad, the rigid member being of higher rigidity than the cushion pad, the rigid member protruding in a direction in which the side support portion protrudes, and the rigid member having
      an end and a side contacting the surface member, the end and the side of the rigid member directly connected to a bottom and a side, respectively, of the surface member; and
   both the surface member and the rigid member being formed of cloth and being connected together by an adhesive or through sewing.

7. The vehicle seat of claim 6, wherein the surface member is located on a lower surface of the cushion pad.

8. The vehicle seat of claim 6, further comprising a cushion support member on which the surface member of the cushion pad is placed.

9. The vehicle seat of claim 8, wherein the cushion support member is a seat frame, and wherein the surface member faces the seat frame so as to protect a surface of the cushion pad from damage that can result from being rubbed against the seat frame.

10. The vehicle seat of claim 6, wherein the rigid member is firmly attached to the surface member.

\* \* \* \* \*